(12) United States Patent
Bleidorn

(10) Patent No.: US 12,218,792 B2
(45) Date of Patent: Feb. 4, 2025

(54) EFFICIENT DETECTION OF DHCPV4 SERVICE UNAVAILABILITY IN A NETWORK GATEWAY ROUTER

(71) Applicant: Charter Communications Operating, LLC, St. Louis, MO (US)

(72) Inventor: Timothy Bleidorn, Colorado Springs, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/178,862

(22) Filed: Mar. 6, 2023

(65) Prior Publication Data
US 2024/0305516 A1    Sep. 12, 2024

(51) Int. Cl.
| H04L 41/06 | (2022.01) |
| H04L 1/1607 | (2023.01) |
| H04L 12/46 | (2006.01) |
| H04L 12/66 | (2006.01) |
| H04L 41/12 | (2022.01) |
| H04L 45/00 | (2022.01) |
| H04L 61/5014 | (2022.01) |
| H04L 61/5038 | (2022.01) |

(52) U.S. Cl.
CPC ............ *H04L 41/06* (2013.01); *H04L 1/1607* (2013.01); *H04L 12/4633* (2013.01); *H04L 12/66* (2013.01); *H04L 41/12* (2013.01); *H04L 45/66* (2013.01); *H04L 61/5014* (2022.05); *H04L 61/5038* (2022.05)

(58) Field of Classification Search
CPC ... H04L 1/1607; H04L 12/4633; H04L 12/66; H04L 41/06; H04L 41/12; H04L 45/66; H04L 61/5014; H04L 61/5038

USPC .......................................................... 709/223
See application file for complete search history.

(56) References Cited

U.S. PATENT DOCUMENTS

| 9,621,413 | B1 * | 4/2017 | Lee .......... H04L 41/08 |
| 11,240,098 | B2 | 2/2022 | Bleidorn et al. |
| 2010/0046524 | A1 * | 2/2010 | Rune .......... H04L 12/4633 |
| | | | 370/395.53 |

(Continued)

OTHER PUBLICATIONS

Merriam-Webster's Collegiate Dictionary 1021, 1070 (10th ed. 1993) (Year: 1993).*
Author Unknown, "ONAP vCPE Blueprint Overview," 2018, 10 pages.

*Primary Examiner* — David P Zarka
(74) *Attorney, Agent, or Firm* — Dority & Manning, P.A.

(57) ABSTRACT

A bridged gateway coupled to a local area network (LAN) receives a layer 2 frame from a device coupled to the LAN. The bridged gateway forwards, to a network gateway router that provides layer 3 routing services for the LAN, the layer 2 frame via a layer 2 tunnel. The bridged gateway determines that the layer 2 frame comprises a dynamic host configuration protocol (DHCP) discover message, the DHCP discover message including an initial message in a four message sequence used by the network gateway router and the device to provide an internet protocol (IP) address to the device. The bridged gateway determines that the four message sequence between the device and the network gateway router did not complete. The bridged gateway, in response to determining the four message sequence did not complete, sends, to a destination, an alert that comprises information indicating a problem with the network gateway router.

19 Claims, 14 Drawing Sheets

(56) References Cited

U.S. PATENT DOCUMENTS

| | | | |
|---|---|---|---|
| 2010/0191839 A1* | 7/2010 | Gandhewar | H04L 61/103 |
| | | | 709/220 |
| 2018/0367499 A1* | 12/2018 | Bansal | H04L 61/30 |
| 2023/0007703 A1* | 1/2023 | Low | H04W 12/108 |
| 2023/0037983 A1* | 2/2023 | Catovic | H04W 68/02 |
| 2023/0090622 A1* | 3/2023 | Zhou | H04L 47/10 |
| | | | 370/235 |
| 2023/0371079 A1* | 11/2023 | Wang | H04W 72/0453 |

* cited by examiner

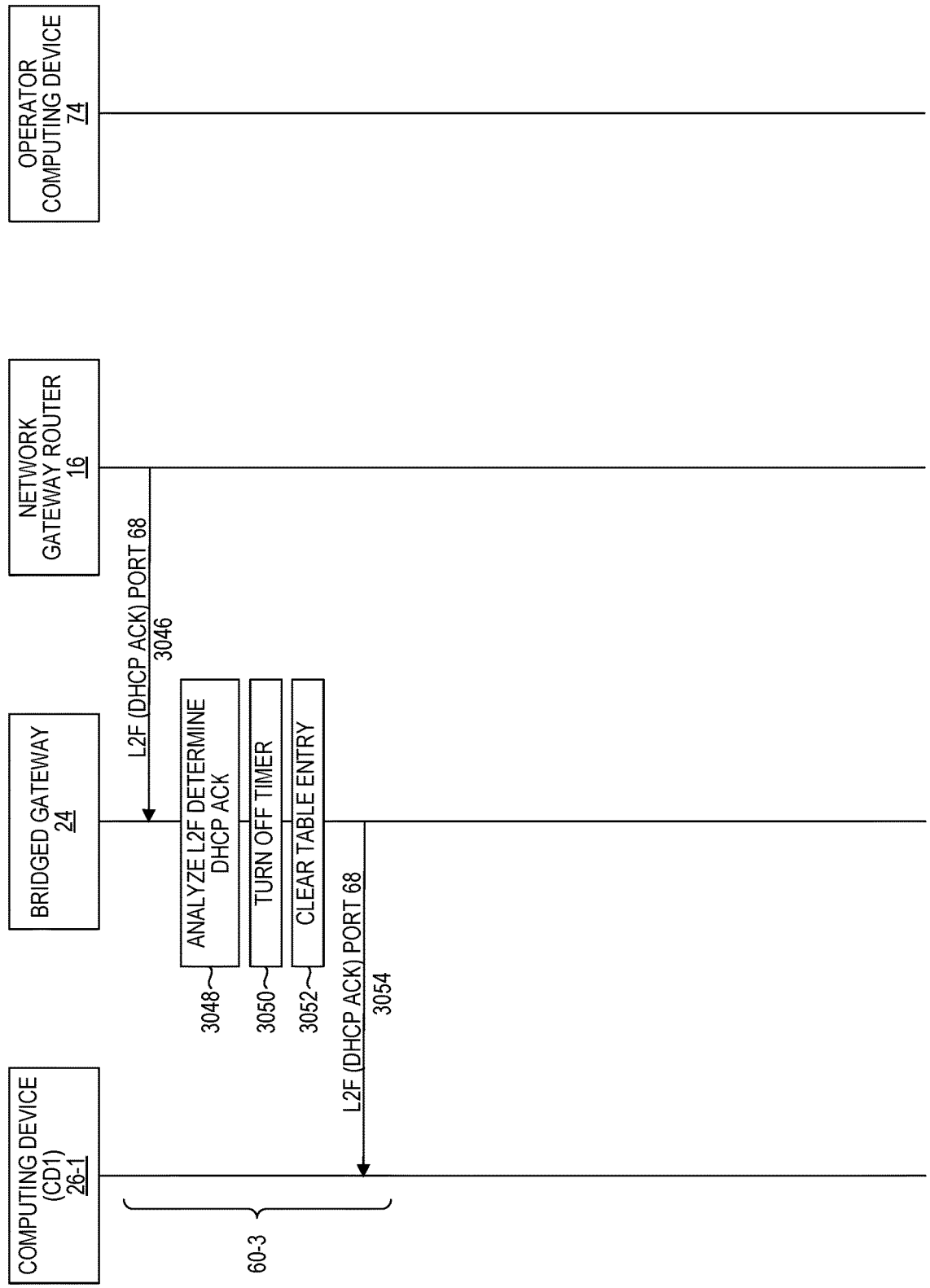

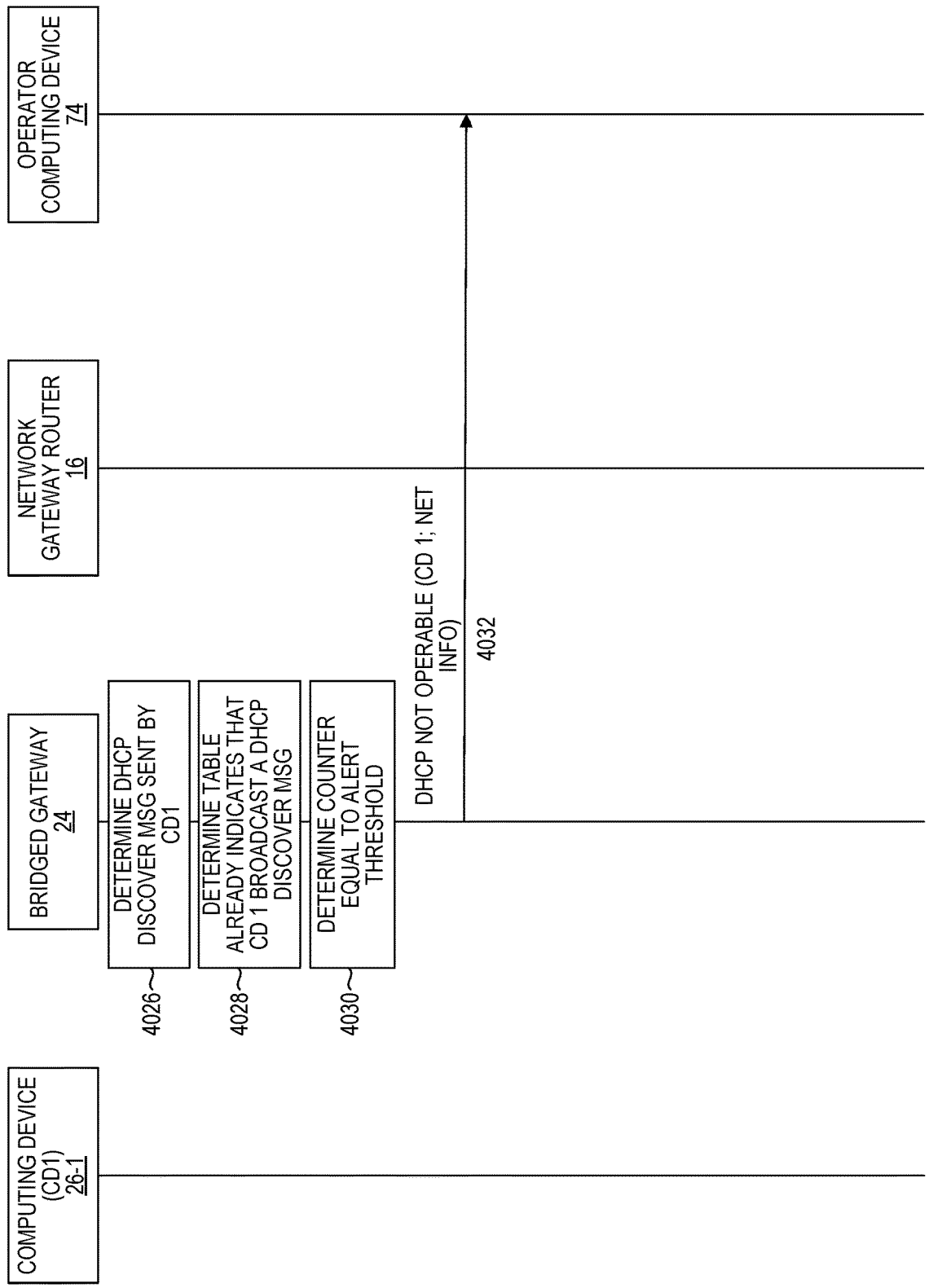

EFFICIENT DETECTION OF DHCPV4 SERVICE UNAVAILABILITY IN A NETWORK GATEWAY ROUTER

BACKGROUND

Devices connected to a local area network (LAN) typically communicate with other devices connected to the same LAN via layer 2 communication protocols, and with devices connected to another LAN via layer 3 communication protocols. Layer 3 protocol communications are facilitated via a gateway router that is typically physically connected to the same LAN and also connected to another network.

SUMMARY

The embodiments disclosed efficient detection of DHCPV4 service unavailability in a network gateway router.

In one embodiment a method is provided. The method includes receiving, by a bridged gateway coupled to a local area network (LAN), a first layer 2 frame from a device coupled to the LAN. The method further includes forwarding, by the bridged gateway to a network gateway router that provides layer 3 routing services for the LAN and includes a DHCPV4 service, the first layer 2 frame via a layer 2 tunnel. The method further includes determining, by the bridged gateway, that the first layer 2 frame comprises a first dynamic host configuration protocol (DHCP) discover message, the first DHCP discover message comprising an initial message in a four message sequence used by the network gateway router and the device to provide an internet protocol (IP) address to the device. The method further includes determining, by the bridged gateway, that the four message sequence between the device and the network gateway router did not complete. The method further includes, in response to determining that the four message sequence did not complete, sending, by the bridged gateway to a destination, an alert that comprises information indicating a problem with obtaining an IP address via the DHCP service.

In another embodiment a bridged gateway is provided. The bridged gateway includes a memory, and a processor device coupled to the memory configured to receive a first layer 2 frame from a device coupled to a LAN. The processor device is further configured to forward, to a network gateway router that provides layer 3 routing services for the LAN and includes a DHCP service, the first layer 2 frame via a layer 2 tunnel. The processor device is further configured to determine that the first layer 2 frame comprises a first DHCP discover message, the first DHCP discover message comprising an initial message in a four message sequence used by the network gateway router and the device to provide an IP address to the device. The processor device is further configured to determine that the four message sequence between the device and the network gateway router did not complete. The processor device is further configured to, in response to determining that the four message sequence did not complete, send, to a destination, an alert that comprises information indicating a problem with obtaining an IP address via the DHCP service.

In another embodiment a non-transitory computer-readable storage medium is provided. The non-transitory computer-readable storage medium includes executable instructions configured to cause a processor device of a bridged gateway to receive a first layer 2 frame from a device coupled to a LAN. The instructions are configured to cause the processor device to forward, to a network gateway router that provides layer 3 routing services for the LAN and includes a DHCP service, the first layer 2 frame via a layer 2 tunnel. The instructions are configured to cause the processor device to determine that the first layer 2 frame comprises a first DHCP discover message, the first DHCP discover message comprising an initial message in a four message sequence used by the network gateway router and the device to provide an IP address to the device. The instructions are configured to cause the processor device to determine that the four message sequence between the device and the network gateway router did not complete. The instructions are configured to cause the processor device to, in response to determining that the four message sequence did not complete, send, to a destination, an alert that comprises information indicating a problem with obtaining an IP address via the DHCP service.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 4A-4C depict a message sequence diagram illustrating messages between and actions taken by various components illustrated in FIGS. 1A-1C to implement efficient detection of DHCP service unavailability in a network gateway router according to another embodiment;

FIGS. 5A-5B depict a message sequence diagram illustrating messages between and actions taken by various components illustrated in FIGS. 1A-1C to implement efficient detection of DHCP service unavailability in a network gateway router according to another embodiment;

DETAILED DESCRIPTION

Figure 1A:
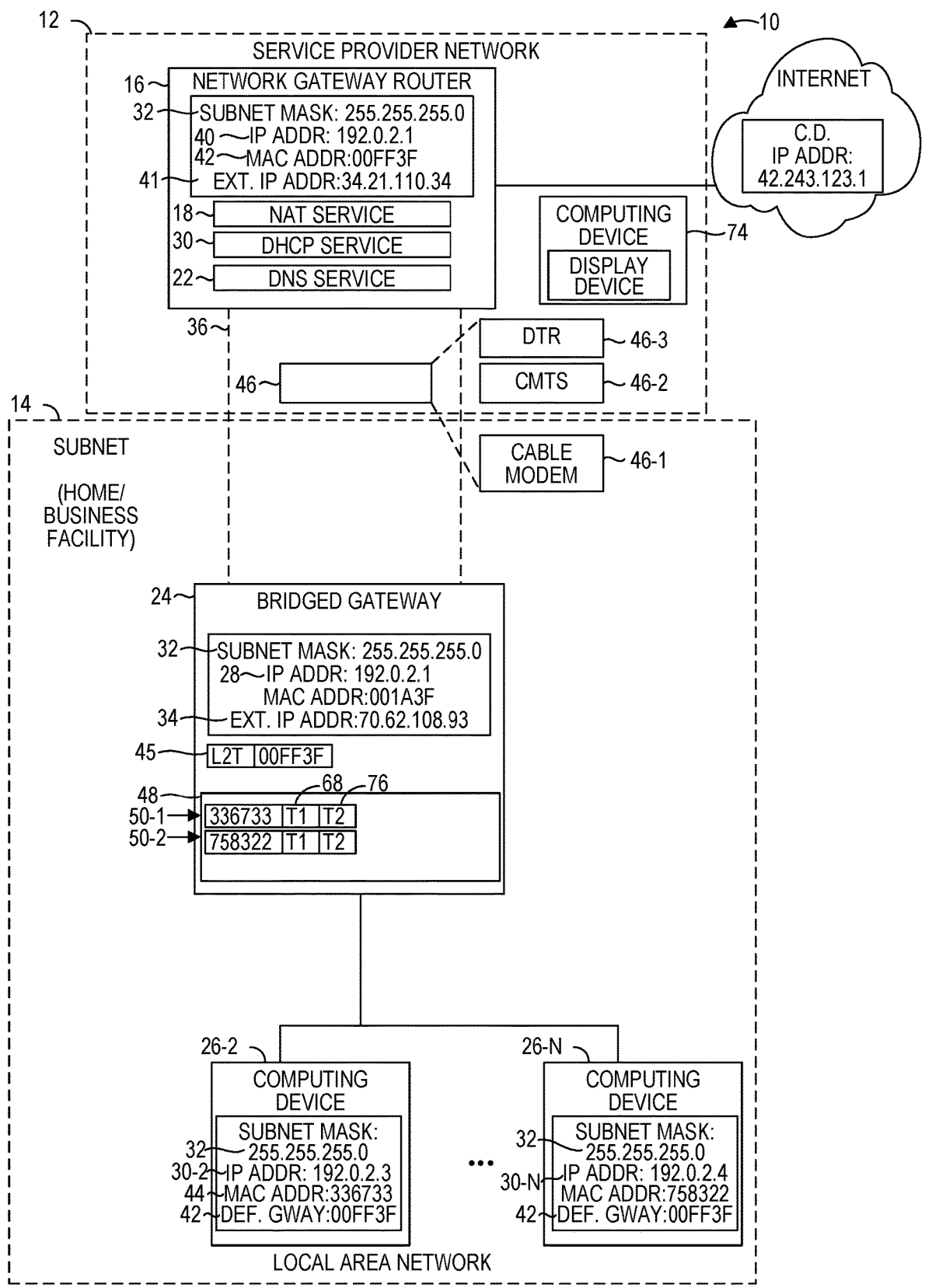
FIGS. 1A-1C are block diagrams of a system for facilitating efficient detection of dynamic host configuration protocol (DHCP) service unavailability in a network gateway router according to some embodiments.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Devices connected to a local area network (LAN) typically communicate with other devices connected to the same LAN via layer 2 communication protocols, and with devices connected to another LAN via layer 3 communication protocols. Layer 3 protocol communications are facilitated via a gateway router that is typically physically connected to the same LAN and also connected to another network.

Service providers that provide a customer premises with Internet access sometimes provide the customer with a gateway router that is connected to the LAN of the customer, and also connected to the service provider's network. The gateway router implements traditional gateway router services, such as dynamic host configuration protocol (DHCP) services for providing network-connected computing devices with internet protocol (IP) addresses as needed, network address translation (NAT) services to translate private IP addresses associated with a subnetwork to a public IP address, Domain Name System (DNS) services for translating a domain name to an IP address, and the like.

A service provider may desire to provide gateway functionality from a location within the service provider's network rather than from the customer premises. Moving the gateway functionality from the subscriber's physical location to a network gateway router at a service provider's location may make it easier to support customer issues and reduce the need to send a technician to a customer premises such as a home or business.

The terms subnetwork, or subnet, will be treated synonymously herein, and refer to a data communications network, often but not necessarily an Ethernet network, wherein each connected computing device on the subnet has an IP address that has the same network address, and which utilizes the same subnet mask to determine whether other computing devices are on the same network or are on a different network. Such computing devices may be referred to herein as being "on" or "connected to" or "coupled to" the same subnet. Computing devices on the same subnet can communicate with one another, typically via layer 2 addressing, such as a media access control (MAC) address, without the need for a router. A LAN is an example of a subnet.

Since a network gateway router is not physically connected to the LAN, to implement a network gateway router in a manner that is transparent to devices connected to the LAN, a device on the LAN, such as a bridged gateway, may establish a layer 2 (over layer 3) tunnel with the network gateway router, and send layer 2 frames generated by devices on the LAN to the network gateway router, and send frames generated by the network gateway router to devices on the LAN. This is done transparently such that devices on the LAN are unaware that the gateway router is not actually directly connected to the same physical network as the devices on the LAN.

Most LANs dynamically provide a device that has connected to the LAN with an IP address via a DHCP service. Without an IP address a device cannot communicate with a device that is not on the LAN, such as an Internet website. Consequently, a malfunctioning DHCP service will likely rapidly result in customer dissatisfaction with a service provider that provides data access to the customer. When a device on a LAN cannot obtain an IP address, it would be desirable for the bridged gateway to be able to become aware of this situation and inform the service provider that a problem exists. Providing such a notification may allow the service provider to fix the problem relatively quickly, and/or may provide useful information to the service provider that may help the service provider determine the cause of the problem. However, it would also be desirable that any such mechanism to determine that a DHCP service has become inoperable not increase traffic on the network. For example, it would be undesirable for hundreds of thousands, or millions, of bridged gateways to periodically attempt to query the DHCP service to determine if the DHCP service is operable because such communications would greatly increase network usage and require processing time of the DHCP service to respond to such communications.

The embodiments herein disclose efficient detection of DHCP service unavailability in a network gateway router without increasing network traffic or requiring additional processing by other computing devices. The unavailability may be due to the network gateway router itself, a device between the LAN and the gateway router, a cable or other medium in the path, or due to the DHCP service. The bridged gateway receives a layer 2 frame from a device coupled to the LAN. The bridged gateway forwards the layer 2 frame via a layer 2 tunnel to a network gateway router that provides layer 3 routing services for the LAN and includes a DHCP service. The bridged gateway determines that the layer 2 frame includes a DHCP discover message that comprises an initial message in a four message sequence used by the network gateway router and the device to provide an IP address to the device. The bridged gateway determines that the four message sequence between the device and the network gateway router did not complete, and sends an alert that comprises information indicating a problem with obtaining an IP address via the DHCP service to a destination.

FIG. 1A is a block diagram of a system 10 for facilitating efficient detection of DHCP service unavailability in a network gateway router by a bridged gateway according to some embodiments. The system 10 includes a service provider network 12 and a local area network, referred to herein as a local subnetwork (subnet) 14, or a LAN 14, located in a business or home. The service provider network 12 includes a network gateway router 16 (sometimes referred to as a broadband network gateway) that is configured to provide, for the local subnet 14, default gateway router functions, such as, by way of non-limiting example, one or more of a NAT service 8, a DHCP service 20 and a DNS service 22. The network gateway router 16 is physically located in a facility controlled by the respective service provider, and may be located tens, hundreds, or thousands of miles from the local subnet 14. The network gateway router 16 may be a special purpose routing device, or may be implemented via gateway routing functions executing on a conventional computing device. In some embodiments, the network gateway router 16 may comprise a virtual gateway as described in TR-317 Network Enhanced Residential Gateway, available at www.broadband-forum.org/download/TR-317.pdf. In some embodiments the network gateway router 16 may comprise a Broadband Network Gateway (BNG) that implements a plurality of virtual gateways that are respectively associated with different customer subnets.

The local subnet 14 includes a bridged gateway 24 that is coupled to the local subnet 14 via a layer 2 transceiver, such as an Ethernet wired transceiver, a Wi-Fi transceiver, or both. The bridged gateway 24 operates as a transparent tunneling mechanism as will be described in greater detail below. In some embodiments, the bridged gateway 24 may have two modes, a first mode wherein the bridged gateway 24 operates in a tunneling mode, and a second mode wherein, if desired, the bridged gateway 24 operates in a routing mode and serves as a gateway router.

The bridged gateway 24 is communicatively coupled to a plurality of computing devices 26-1-26-N via one or more networking technologies, such as Ethernet, Wi-Fi®, or the like. At a point in time illustrated in FIG. 1A, the bridged gateway 24 and the plurality of computing devices 26-2-26-N are all on the same subnet, and thus each have an IP address 28, 30-2-30-N, respectively, that identifies a same network address, in particular, that of the local subnet 14, and which utilizes the same subnet mask 32 to determine whether another computing device is on the same subnet, or on a different network. The computing device 26-1 does not yet have an IP address or know the subnet mask 32 of the subnet 14. The computing devices 26-2-26-N obtained the respective IP addresses 30-2-30-N and the subnet mask 32 from the network gateway router 16 during an initial DHCP handshake, or message sequence, that the computing devices 26-2-26-N initiated during a connection phase, as will be discussed in greater detail below.

The IP addresses 28, 30-2-30-N may be referred to as being "on" the local subnet 14. The bridged gateway 24 may also have an external IP address 34 that is not on the local subnet 14. The bridged gateway 24 may also be configured to be able to provide to the computing devices 26-2-26-N, when in routing mode, default gateway router functions.

The network gateway router 16 has an IP address 40 that is on the local subnet 14 and, in some embodiments, may be the same as the IP address 28 of the bridged gateway 24. The bridged gateway 24 and the network gateway router 16 communicate with one another via a tunnel 36 that is implemented via a tunneling protocol. The tunneling protocol may comprise any suitable tunneling protocol; however, in some embodiments, the tunneling protocol comprises a layer 2 tunneling protocol such as, by way of non-limiting example, the generic routing encapsulation (GRE) tunneling protocol. The bridged gateway 24 and the network gateway router 16 may use the external IP address 34 and the external IP address 41, respectively, to establish the layer 2 (over layer 3) tunnel.

The network gateway router 16 also utilizes the same subnet mask 32 as the bridged gateway 24 and the computing devices 26-2-26-N. The network gateway router 16 may also have an external IP address 41 that is not on the local subnet 14. The bridged gateway 24, when in tunneling mode, forwards all layer 2 frames on the local subnet 14 that have a destination address of the network gateway router 16, all broadcast layer 2 frames, and layer 2 frames that have a destination address off the local subnet 14, to the network gateway router 16. To the computing devices 26-2-26-N, the network gateway router 16 appears to be directly coupled to the local subnet 14 in the same manner as the computing devices 26-2-26-N. The bridged gateway 24 may maintain a network gateway router MAC address 45 to determine if layer 2 frames are destined for the network gateway router 16.

The computing device 26-2, for example, may address a layer 2 frame using a MAC address 42 (i.e., a layer 2 data link address) of the network gateway router 16 and transmit the layer 2 frame on the local subnet 14. The bridged gateway 24 determines that the layer 2 frame has the MAC address 42 of the network gateway router 16, encapsulates the layer 2 frame in accordance with the tunneling protocol, and forwards the encapsulated layer 2 frame to the network gateway router 16.

The network gateway router 16 may generate a response layer 2 frame, address the response layer 2 frame to a MAC address 44 of the computing device 26-2, encapsulate the response layer 2 frame in accordance with the tunneling protocol, and send the encapsulated layer 2 frame to the bridged gateway 24 via the tunnel 36. The bridged gateway 24 receives the encapsulated response layer 2 frame, extracts the response layer 2 frame, and forwards the response layer 2 frame to the computing device 26-2. Thus, each of the computing devices 26-2-26-N, the bridged gateway 24 and the network gateway router 16 have layer 2 connectivity to one another and can communicate with one another utilizing layer 2 MAC addresses.

The tunnel 36 may traverse a communications path that includes one or more devices 46. In this example, the devices 46 include a cable modem 46-1, a cable modem termination system (CMTS) 46-2, and a distribution router (DTR) 46-3. In other embodiments, the tunnel 36 may traverse a 4G or 5G base station for example. In this particular implementation, the cable modem 46-1 is located in the same home or business facility as the bridged gateway 24, and the CMTS 46-2 and DTR 46-3 are located in facilities operated by the respective service provider. In some embodiments, the bridged gateway 24 and the cable modem 46-1 may be a single device.

The bridged gateway 24 may be a learning bridge and maintain a data structure, in this example a table 48, in which the bridged gateway 24 stores device identifiers, such as, by way of non-limiting example, MAC addresses, of computing devices 26 that transmit layer 2 frames on the subnet 14. In this example, an entry 50-1 contains the MAC address of the computing device 26-2 and indicates that the computing device 26-2 has previously transmitted a layer 2 frame on the subnet 14. An entry 50-2 contains the MAC address of the computing device 26-N and indicates that the computing device 26-N has also previously transmitted a layer 2 frame on the subnet 14. The entries 50-1-50-2 may be referred to as entries 50 generally. In some embodiments, the entries 50 may each include a timer 68 that is set to a predetermined value each time a MAC address is added to the table 48, or each time a layer 2 frame is received from a MAC address for which an entry 50 already exists. If the timer expires, then the entry 50 may be removed from the table 48 to ensure that entries 50 are maintained only for active computing devices 26. As will be discussed in greater detail below, in some embodiments, the entries 50 may also each include a timer 76 that may be used to determine whether responses from the network gateway router 16 have been received within a predetermined time interval.

A description of processing that may occur to obtain an IP address according to one embodiment will be described from the perspective of the computing device 26-2 at the time the computing device 26-2 initially connects to the subnet 14. At the time the computing device 26-2 initially connects to the subnet 14, the computing device 26-2 does not have an IP address on the local subnet 14. The computing device 26-2 generates and transmits a layer 2 frame that comprises a DHCP discover message addressed to a broadcast address (e.g., the destination MAC address is set to "FF:FF:FF:FF:FF:FF") to obtain an IP address on the local subnet 14. The bridged gateway 24 receives the layer 2 frame and accesses the table 48. The bridged gateway 24 determines that the table 48 does not have an entry 50 that corresponds to the computing device 26-2, and generates the entry 50-1. The bridged gateway 24 sets the timer 68 to a predetermined time interval, such as one minute, five minutes, ten minutes or the like, which will be used to determine whether the computing device 26-2 remains active. Each time the bridged gateway 24 receives a layer 2 frame from the computing device 26-2, the bridged gateway 24 may reset the timer 68. If the timer 68 expires, the bridged gateway 24 may remove the entry 50-1 from the table 48.

The bridged gateway 24 determines that the layer 2 frame comprises a DHCP discover message by analyzing the contents of the layer 2 frame. Because DHCP handshakes often involve ports 67 and 68, in some embodiments, the bridged gateway 24 may only analyze layer 2 frames directed to ports 67 or 68.

The bridged gateway 24 determines that the layer 2 frame is a broadcast message and thus not directed to a particular layer 2 MAC address, and thus sends the layer 2 frame to the network gateway router 16 via the tunnel 36 (solely for purposes of brevity, the steps of encapsulation associated with use of the tunnel 36 will not always be discussed herein), as well as to the computing devices 26-2-26-N. Either prior to sending the layer 2 frame to the network gateway router 16 or subsequent to sending the layer 2 frame to the network gateway router 16, the bridged gateway 24 sets the timer 76 associated with the computing device 26-2 to a predetermined time interval, such as 100 milliseconds (ms), 500 ms, 1 second, or the like.

The network gateway router 16 receives the layer 2 frame. The DHCP service 20 determines that the layer 2 frame comprises a DHCP discover message and selects the IP address 30-2 from a pool of available IP addresses of the local subnet 14, and generates a DHCP offer message that includes the IP address 30-2 for use by the computing device 26-2, information identifying the network gateway router 16 as the default gateway router for the local subnet 14, including the IP address 40 of the network gateway router 16, and the subnet mask 32. The network gateway router 16 generates a layer 2 frame including the DHCP offer response and addresses the layer 2 frame to the computing device 26-2. The network gateway router 16 encapsulates the layer 2 frame using a layer 2 tunnel encapsulation protocol, such as, by way of non-limiting example, GRE, and sends the encapsulated layer 2 frame to the bridged gateway 24.

The bridged gateway 24 receives the encapsulated layer 2 frame, decapsulates the layer 2 frame, and determines that the layer 2 frame comprises a DHCP offer message addressed to the computing device 26-2. In response to determining that the layer 2 frame comprises a DHCP offer message addressed to the computing device 26-2, the bridged gateway 24 turns off the timer 76 associated with the computing device 26-2.

The bridged gateway 24 sends the layer 2 frame to the computing device 26-2. The computing device 26-2 receives the response and determines that the IP address 30-2 is acceptable. The computing device 26-2 stores the IP address 30-2 and the subnet mask 32 of the network gateway router 16. The computing device 26-2 generates a layer 2 frame comprising a DHCP request message again addressed to a broadcast address. The bridged gateway 24 receives the layer 2 frame and accesses the table 48. The bridged gateway 24 determines that the table 48 contains the entry 50-1 that corresponds to the computing device 26-2. The bridged gateway 24 resets the timer 68 to the predetermined time interval. The bridged gateway 24 determines that the layer 2 frame comprises a DHCP request message by analyzing the contents of the layer 2 frame. It will be appreciated that the exact addressing of the DHCP messages can differ depending on DHCP implementation and whether there is a single DHCP service or multiple DHCP services.

The bridged gateway 24 determines that the layer 2 frame is a broadcast message and thus sends the layer 2 frame to the network gateway router 16 via the tunnel 36. Either prior to sending the layer 2 frame to the network gateway router 16 or subsequent to sending the layer 2 frame to the network gateway router 16, the bridged gateway 24 sets the timer 76 associated with the computing device 26-2 to the predetermined time interval, such as 100 milliseconds (ms), 500 ms, 1 second, or the like.

The network gateway router 16 receives the layer 2 frame. The DHCP service 20 determines that the layer 2 frame comprises a DHCP request message and generates a DHCP acknowledge (ACK) message. The network gateway router 16 generates a layer 2 frame including the DHCP ACK message and addresses the layer 2 frame to the computing device 26-2.

The bridged gateway 24 receives the encapsulated layer 2 frame, decapsulates the layer 2 frame, and determines that the layer 2 frame comprises a DHCP acknowledge message addressed to the computing device 26-2. In response to determining that the layer 2 frame comprises a DHCP acknowledge message addressed to the computing device 26-2, the bridged gateway 24 turns off the timer 76 associated with the computing device 26-2.

The bridged gateway 24 sends the layer 2 frame to the computing device 26-2. The computing device 26-2 receives the DHCP ACK message, and determines that the IP address 30-2 can be used and this completes the DHCP handshake sequence. The computing device 26-2 may generate and broadcast an ARP message using the IP address 40 of the network gateway router 16 to obtain the MAC address 42 of the network gateway router 16 for future unicast communications with the network gateway router 16, such as when the computing device 26-2 desires to communicate with a computing device that is not on the subnet 14.

Figure 1B:
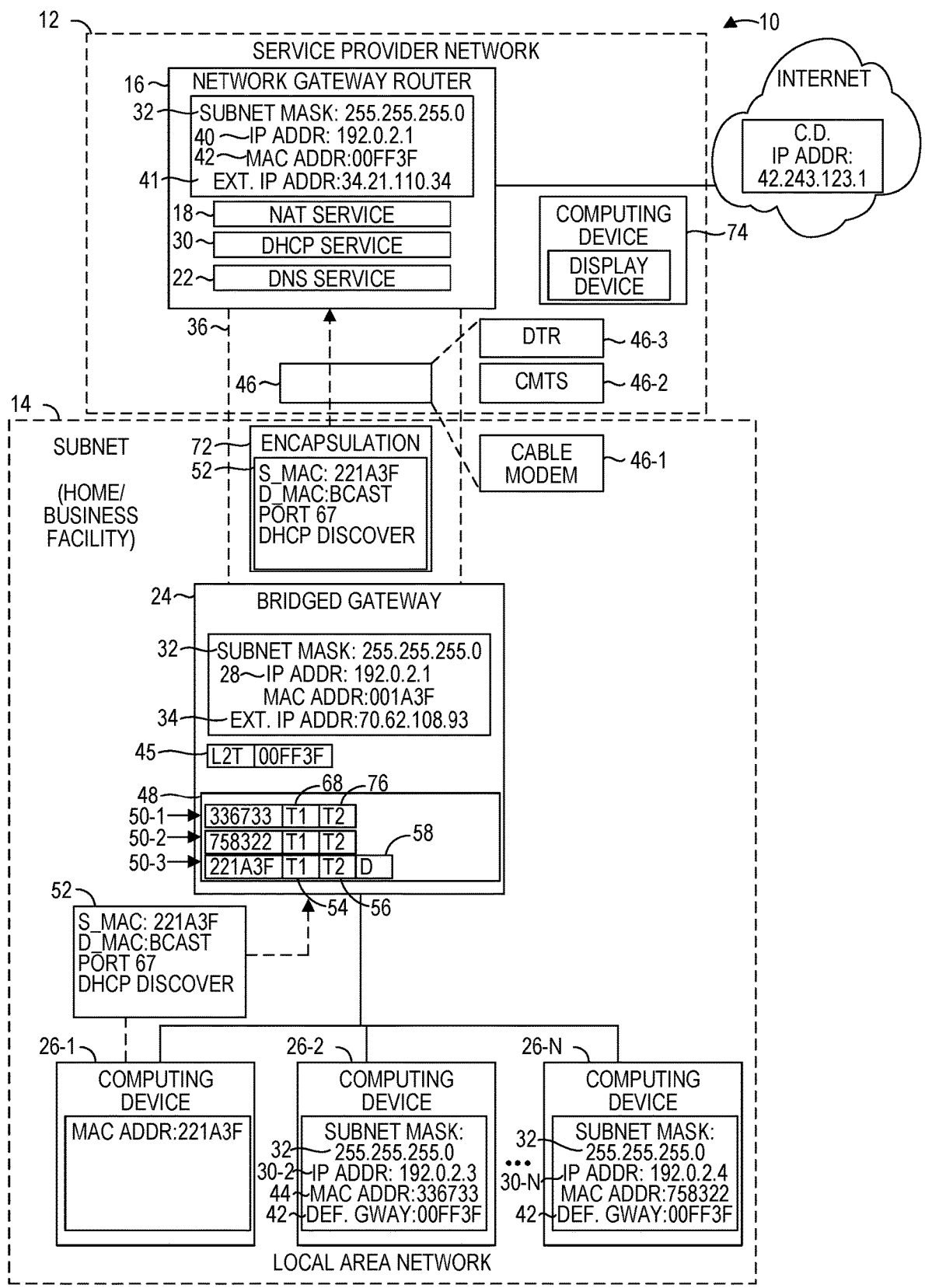

Referring now to FIG. 1B, an example of efficiently determining that the DHCP service is unavailable will be discussed with respect to a computing device 26-1. Assume that the computing device 26-1 initiates a connection with the local subnet 14. Again, the initiation of the connection may occur, for example, when a user physically couples the computing device 26-1 to a switch of the local subnet 14 via an Ethernet cable, the computing device 26-1 joins a Wi-Fi® adapter of the local subnet 14 by entering an appropriate password, by powering on the computing device 26-1 if already connected to the subnet 14, or the like.

At the time the computing device 26-1 initially connects to the subnet 14, the computing device 26-1 does not have an IP address on the local subnet 14. The computing device 26-1 generates and transmits a layer 2 frame 52 that comprises a DHCP discover message addressed to a broadcast address to obtain an IP address on the local subnet 14. The bridged gateway 24 receives the layer 2 frame and accesses the table 48. The bridged gateway 24 determines that the table 48 does not have an entry 50 that corresponds to the computing device 26-1, and generates an entry 50-3. The bridged gateway 24 sets a timer 54 to a predetermined time interval, which will be used to determine whether the computing device 26-1 remains active. The bridged gateway 24 determines that the layer 2 frame 52 comprises a DHCP discover message by analyzing the contents of the layer 2 frame 52.

The bridged gateway 24 determines that the layer 2 frame 52 is a broadcast message and thus not directed to a particular layer 2 MAC address, and thus sends the layer 2 frame 52 to the network gateway router 16 via the tunnel 36, as well as to the computing devices 26-1-26-N. Either prior to sending the layer 2 frame 52 to the network gateway router 16 or subsequent to sending the layer 2 frame 52 to the network gateway router 16, the bridged gateway 24 sets a timer 56 associated with the computing device 26-1 to a predetermined time interval.

In a first example, assume that the timer 56 expires. The bridged gateway 24 determines that the timer 56 has expired and no response was received to a DHCP handshake message. The bridged gateway 24 generates an alert that indicates that the DHCP service 20 is not responding. The bridged gateway 24 sends the alert to a destination, such as an operator computing device 74. The alert includes information indicating a problem with obtaining an IP address via the DHCP service. Note that the bridged gateway 24 made the determination without a need to generate additional traffic on the service provider network and with minimal processing. In particular, the bridged gateway 24 made the determination without communicating directly with the DHCP service 20 and thus did not utilize any of the bandwidth of the service provider's network, or require any processing by the DHCP service 20, such as would be required by sending periodic messages to the DHCP service 20 to determine the status of the DHCP service 20.

In a second example, the bridged gateway 24 may maintain more granular information and distinguish between receiving no response from the network gateway router 16, which would likely indicate a problem with the network gateway router 16 as a whole, or obtaining an unexpected DHCP response, such as either a DHCP NAK message, or receiving a DHCP offer message, but not subsequently receiving a DHCP acknowledge message.

In the second example, the bridged gateway 24 adds, to the entry 50-3, a DHCP sequence identifier (ID) 58 to a value of "D" to indicate that the layer 2 frame 52 comprises a DHCP discover message. The bridged gateway 24 sends the layer 2 frame 52 to the network gateway router 16 via the tunnel 36, as well as to the computing devices 26-1-26-N. In a first sub-example, if the timer 56 elapses, the bridged gateway 24 accesses the entry 50-3 and determines, based on the DHCP sequence ID 58 that a DHCP discover was previously sent to the network gateway router 16 and no response has been received. The bridged gateway 24 generates an alert that indicates that the network gateway router 16 is unreachable since no response was received from the network gateway router 16 to a DHCP discover message.

In a second sub-example the network gateway router 16 receives the layer 2 frame 52. The DHCP service 20 determines that the layer 2 frame 52 comprises a DHCP discover message and selects an IP address from the pool of available IP addresses of the local subnet 14, and generates a DHCP offer message that includes the IP address for use by the computing device 26-1, information identifying the network gateway router 16 as the default gateway router for the local subnet 14, including the IP address 40 of the network gateway router 16, and the subnet mask 32. The network gateway router 16 generates a layer 2 frame including the DHCP offer message and addresses the layer 2 frame to the computing device 26-1. The network gateway router 16 encapsulates the layer 2 frame using a layer 2 tunnel encapsulation protocol, such as, by way of non-limiting example, GRE, and sends the encapsulated layer 2 frame to the bridged gateway 24.

The bridged gateway 24 receives the encapsulated layer 2 frame, decapsulates the layer 2 frame, and determines that the layer 2 frame comprises a DHCP offer message addressed to the computing device 26-1. In response to determining that the layer 2 frame comprises a DHCP offer message addressed to the computing device 26-1, the bridged gateway 24 turns off the timer 568 associated with the computing device 26-1.

Figure 1C:
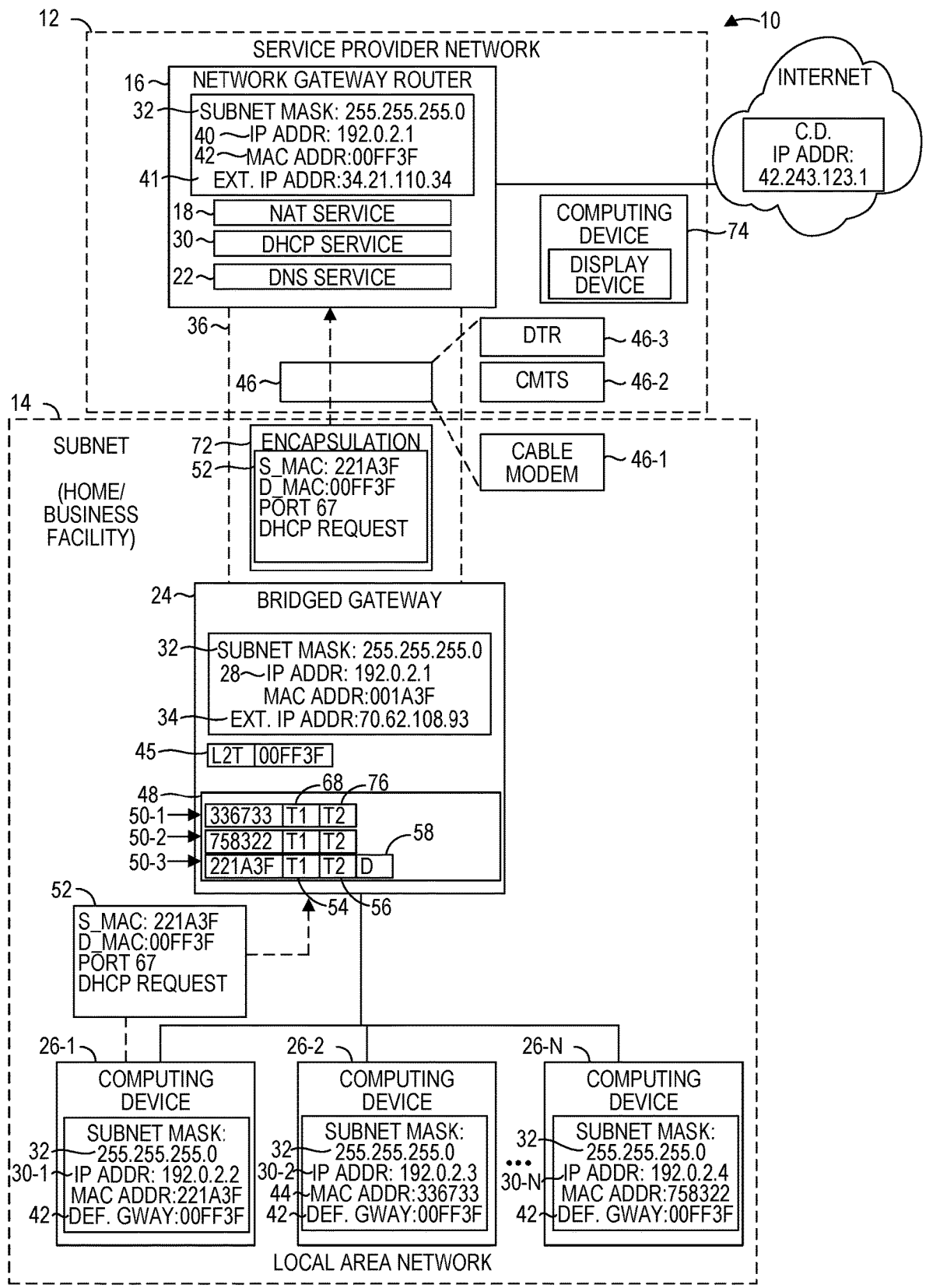

The bridged gateway 24 sends the layer 2 frame to the computing device 26-1. The computing device 26-1 receives the DHCP response message, and determines that the IP address is acceptable. The computing device 26-1 stores an IP address 30-1 and the subnet mask 32 of the network gateway router 16. Referring now to FIG. 1C, the computing device 26-1 generates a layer 2 frame 53 comprising a DHCP request message addressed to a broadcast address. The bridged gateway 24 receives the layer 2 frame 53 and accesses the table 48. The bridged gateway 24 determines that the table 48 contains the entry 50-3 that corresponds to the computing device 26-1. The bridged gateway 24 resets the timer 54 to the predetermined time interval. The bridged gateway 24 determines that the layer 2 frame 53 comprises a DHCP request message by analyzing the contents of the layer 2 frame 53. The bridged gateway 24 sets the DHCP sequence ID 58 to a value of "R" to indicate that the layer 2 frame 53 comprises a DHCP request.

The bridged gateway 24 determines that the layer 2 frame 53 is addressed to the broadcast address and thus sends the layer 2 frame 53 to the network gateway router 16 via the tunnel 36. Either prior to sending the layer 2 frame 53 to the network gateway router 16 or subsequent to sending the layer 2 frame 53 to the network gateway router 16, the bridged gateway 24 sets the timer 56 associated with the computing device 26-1 to the predetermined time interval, such as 100 milliseconds (ms), 500 ms, 1 second, or the like.

Assume, for purposes of illustration, that the timer 56 expires. The bridged gateway 24 determines that the timer 56 has expired and no response was received to a DHCP request message. The bridged gateway 24 generates an alert that indicates that the network gateway router 16 is reachable but the DHCP service 20 is not providing dynamic IP addresses. The bridged gateway 24 sends the alert to a destination, such as an operator computing device 74.

Alternatively, assume that the network gateway router 16 receives the layer 2 frame 53. The DHCP service 20 determines that the layer 2 frame 53 comprises a DHCP request message and generates a DHCP NAK message. The DHCP service 20 generates a layer 2 frame including the DHCP NAK message, addresses the layer 2 frame to the computing device 26-1, and the network gateway router 16 sends the layer 2 frame to the bridged gateway 24.

The bridged gateway 24 receives the encapsulated layer 2 frame, decapsulates the layer 2 frame, and determines that the layer 2 frame comprises a DHCP NAK message addressed to the computing device 26-1. In response to determining that the layer 2 frame comprises a DHCP NAK message addressed to the computing device 26-1, the bridged gateway 24 generates an alert that indicates that the network gateway router 16 is reachable but the DHCP service 20 is not responding. The bridged gateway 24 sends the alert to a destination, such as an operator computing device 74.

Figure 2:
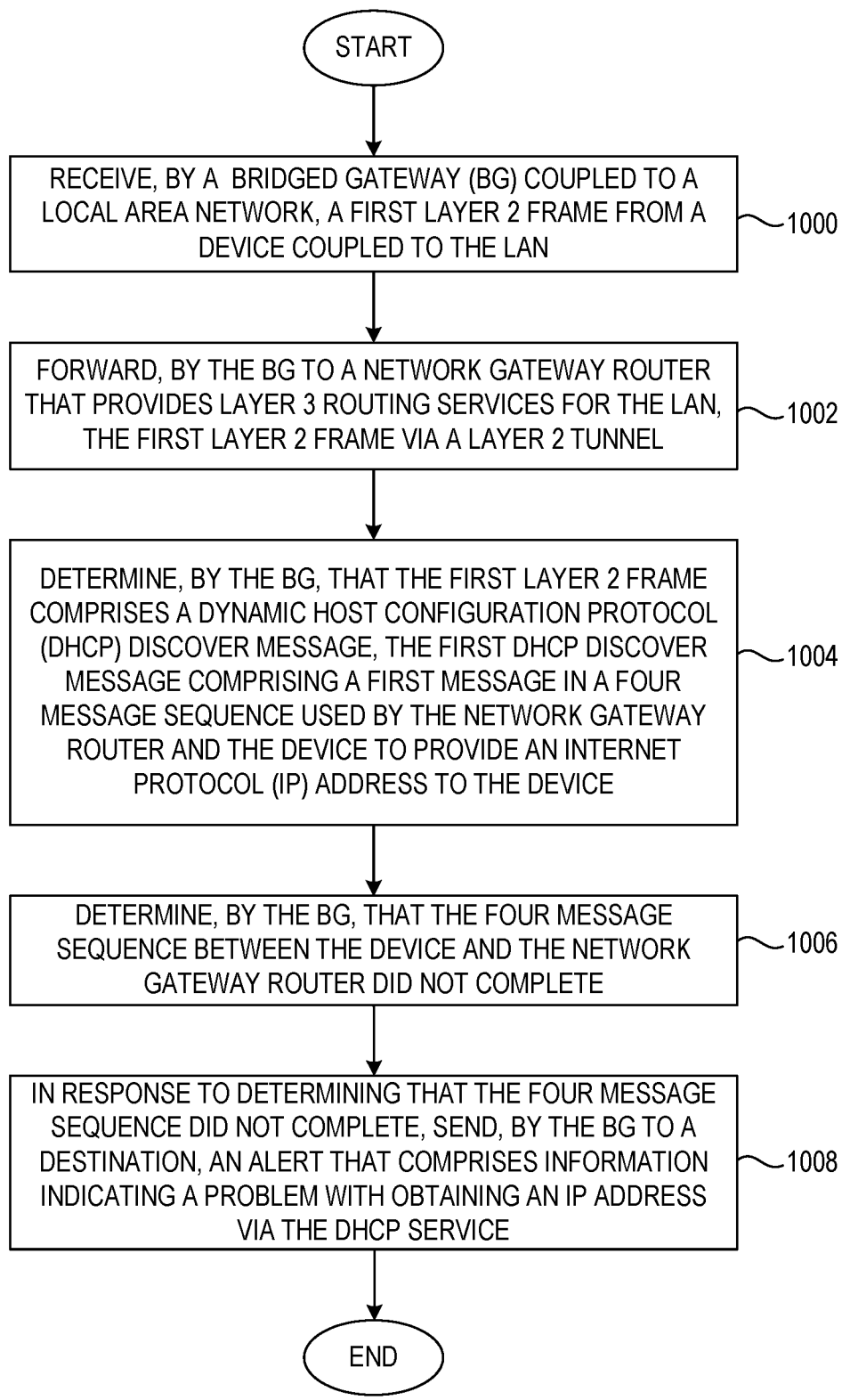
FIG. 2 is a flowchart of a method for efficient detection of DHCP service unavailability in a network gateway router according to one embodiment.

FIG. 2 is a flowchart of a method for efficient detection of DHCP service unavailability in a network gateway router according to one embodiment. FIG. 2 will be discussed in conjunction with FIGS. 1A-1C. The bridged gateway 24 coupled to the LAN 14, receives a layer 2 frame from the computing device 26-1 coupled to the LAN 14 (FIG. 2, block 1000). The bridged gateway 24 forwards, to the network gateway router 16 that provides layer 3 routing services for the LAN 14, the layer 2 frame via the layer 2 tunnel 36 (FIG. 2, block 1002). The bridged gateway 24 determines that the layer 2 frame comprises a DHCP discover message, the DHCP discover message comprising an initial message in a four message sequence used by the network gateway router 16 and a device connecting to the LAN 14 to provide an IP address to the device (FIG. 2, block 1004). The bridged gateway 24 determines that the four message sequence between the computing device 26-1 and the network gateway router 16 did not complete (FIG. 2, block 1006). The bridged gateway 24, in response to determining that the four message sequence did not complete, sends, to a destination, an alert that comprises information indicating a problem with obtaining an IP address via the DHCP service (FIG. 2, block 1008).

Figure 3:
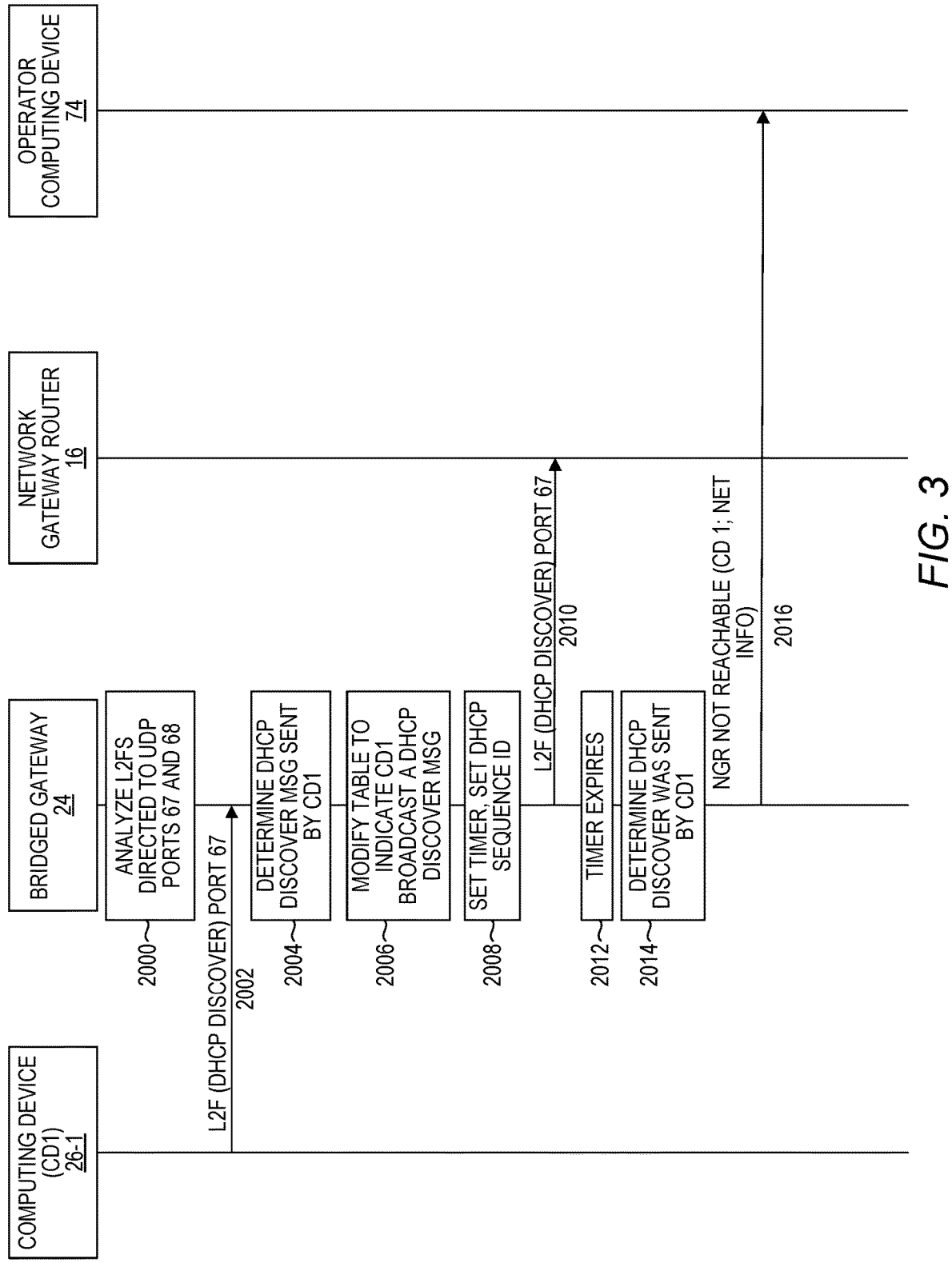
FIG. 3 is a message sequence diagram illustrating messages between and actions taken by various components illustrated in FIGS. 1A-1C to implement efficient detection of DHCP service unavailability in a network gateway router according to one embodiment.

FIG. 3 is a message sequence diagram illustrating messages between and actions taken by various components illustrated in FIGS. 1A-1C to implement efficient detection of DHCP service unavailability in a network gateway router according to one embodiment. In this example, the bridged gateway 24 analyzes layer 2 frames (L2FS) directed to ports 67 and 68 (FIG. 3, block 2000). The computing device 26-1 generates and broadcasts a layer 2 frame that includes a DHCP discover message and is directed to a UDP port 67 (FIG. 3, block 2002). The bridged gateway 24 receives the layer 2 frame and determines that the layer 2 frame includes the DHCP discover message (FIG. 3, block 2004). The bridged gateway 24 modifies the table 48 to indicate that the computing device 26-1 broadcast the DHCP discover message (FIG. 3, block 2006). Specifically, the bridged gateway 24 starts the timer 56 and sets the DHCP sequence ID 58 to a value of "D" (FIG. 3, block 2008). The bridged gateway 24 sends the layer 2 frame to the network gateway router 16 (FIG. 3, block 2010). The timer 56 expires (FIG. 3, block 2012). The bridged gateway 24 accesses the table 48 and determines that the computing device 26-1 has sent a DHCP discover message, and no response was received within the time interval to which the timer 56 was set (FIG. 3, block 2014). In response, the bridged gateway 24 sends an alert that indicates that the network gateway router 16 is unreachable (FIG. 3, block 2016). The alert may include, for example, information related to the subnet 14, such as an identifier of the particular customer subnet 14 and an identifier of the computing device 26-1.

Figure 4A:
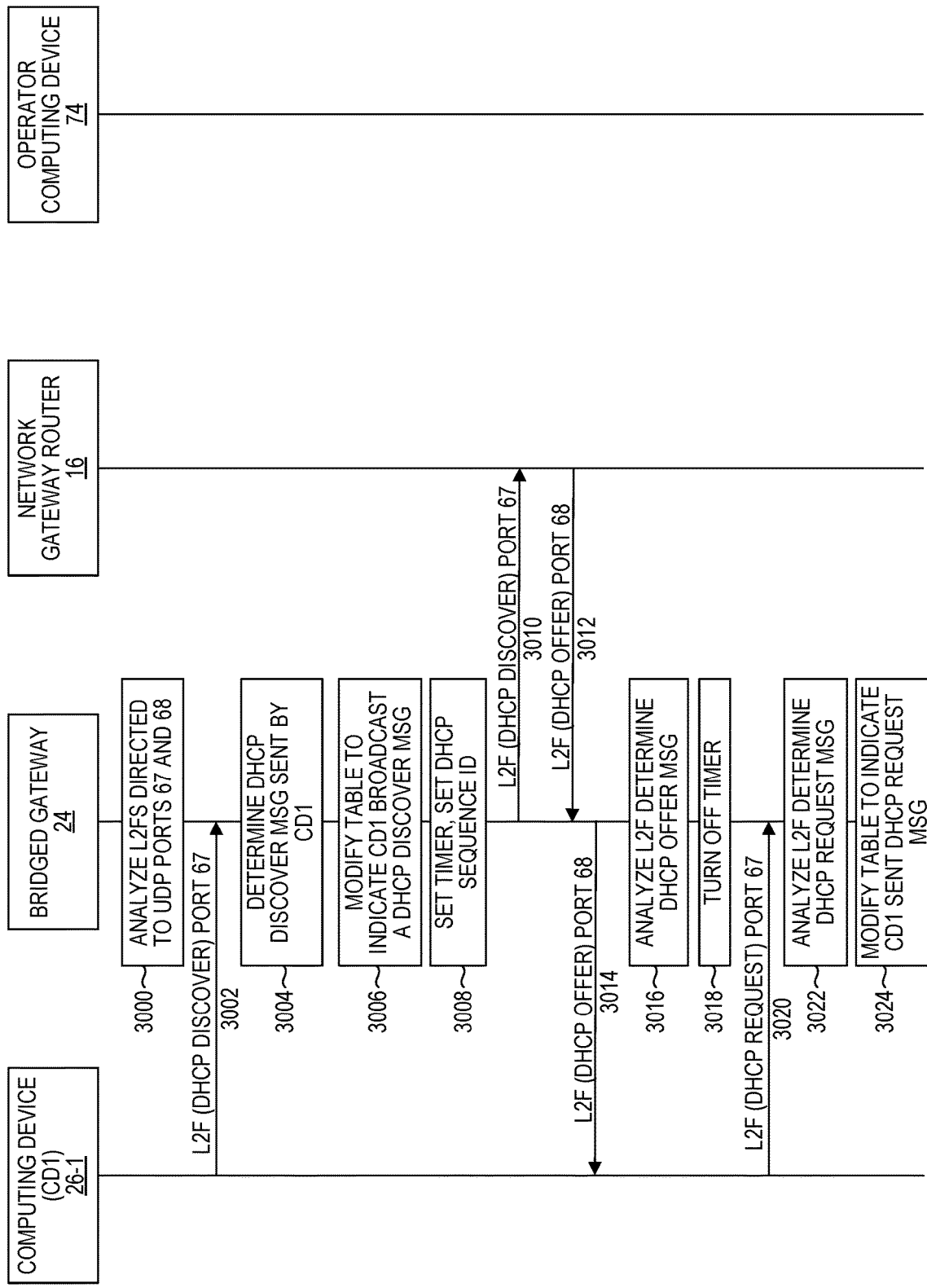
Figure 4B:
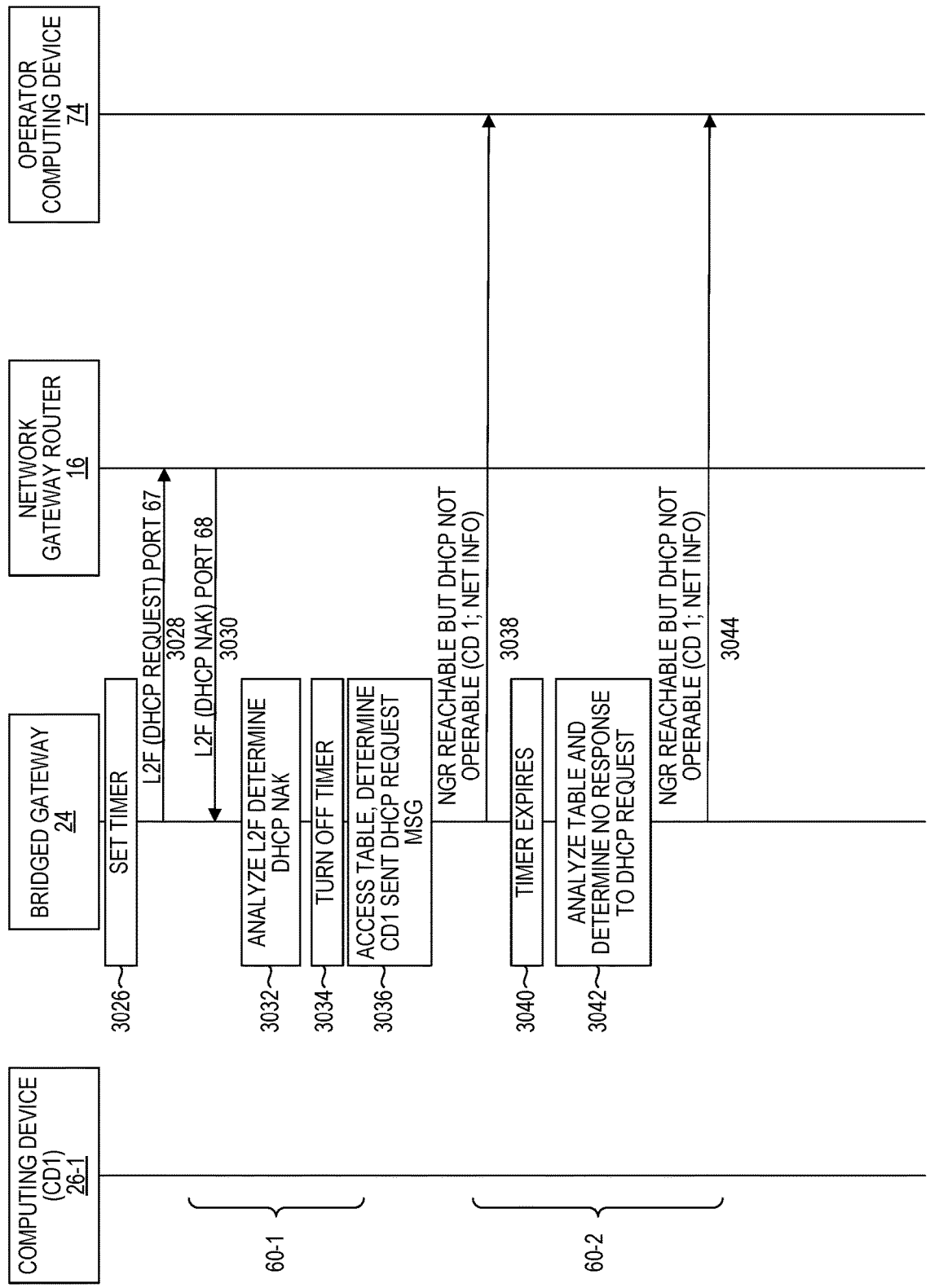

FIGS. 4A-4C depict a message sequence diagram illustrating messages between and actions taken by various components illustrated in FIGS. 1A-1C to implement efficient detection of DHCP service unavailability in a network gateway router according to another embodiment. The bridged gateway 24 analyzes layer 2 frames directed to ports 67 and 68 (FIG. 4, block 3000). The computing device 26-1 generates and broadcasts a layer 2 frame that includes a DHCP discover message and is directed to a UDP port 67 (FIG. 4, block 3002). The bridged gateway 24 receives the layer 2 frame and determines that the layer 2 frame includes the DHCP discover message (FIG. 4, block 3004). The bridged gateway 24 modifies the table 48 to indicate that the computing device 26-1 broadcast the DHCP discover message by setting the DHCP sequence ID 58 to a value of "D" (FIG. 4, block 3006). The bridged gateway 24 starts the timer 56 (FIG. 4, block 3008). The bridged gateway 24 sends the layer 2 frame to the network gateway router 16 (FIG. 4, block 3010).

Prior to the timer 56 expiring, the network gateway router 16 responds with a layer 2 frame that includes a DHCP offer message (FIG. 4, block 3012). The bridged gateway 24 sends the layer 2 frame to the computing device 26-1 (FIG. 4, block 3014). The bridged gateway 24 analyzes the layer 2 frame and determines that it contains a DHCP offer message directed to the computing device 26-1 (FIG. 4, block 3016). The bridged gateway 24 turns off the timer 56 (FIG. 4, block 3018). The bridged gateway 24 receives, from the computing device 26-1, a layer 2 frame comprising a DHCP request message (FIG. 4, block 3020). The bridged gateway 24 analyzes the layer 2 frame and determines that it includes a DHCP request message (FIG. 4, block 3022). The bridged gateway 24 modifies the table 48 to indicate that the computing device 26-1 broadcast the DHCP request message by setting the DHCP sequence ID 58 to a value of "R" (FIG. 4, block 3024). The bridged gateway 24 sets the timer 56 associated with the computing device 26-1 to the predetermined time interval (FIG. 4, block 3026). The bridged gateway 24 sends the layer 2 frame to the network gateway router 16 (FIG. 4, block 3028).

FIG. 4B discloses three alternative event sequences 60-1-60-3. In a first event sequence 60-1, the network gateway router 16 sends a layer 2 frame that comprises a DHCP NAK message in response to the layer 2 frame (FIG. 4, block 3030). The bridged gateway 24 determines that the layer 2 frame includes the DHCP NAK message (FIG. 4, block 3032). The bridged gateway 24 turns off the timer 56 (FIG. 4, block 3034). The bridged gateway 24 analyzes the table 48 and determines that the DHCP NAK message was sent in response to the computing device 26-1 sending a DHCP request message (FIG. 4, block 3036). The bridged gateway 24 sends an alert to the operator computing device 74 indicating that the network gateway router 16 is reachable, but that the DHCP service 20 is not operable (FIG. 4, block 3038).

In a second event sequence 60-2, the timer 56 expires (FIG. 4, block 3040). The bridged gateway 24 accesses the table 48 and determines that the computing device 26-1 send a DHCP request message, and no response was received (FIG. 4, block 3042). The bridged gateway 24 sends an alert to the operator computing device 74 indicating that the network gateway router 16 is reachable, but that the DHCP service 20 is not operable (FIG. 4, block 3044).

Referring now to FIG. 4C, in a third event sequence 60-3, the network gateway router 16 sends a layer 2 frame that comprises a DHCP acknowledge message in response to the layer 2 frame (FIG. 4, block 3046). The bridged gateway 24 determines that the layer 2 frame includes the DHCP acknowledge message (FIG. 4, block 3048). The bridged gateway 24 turns off the timer 56 and clears the DHCP sequence ID 58 (FIG. 4, blocks 3050, 3052). The bridged gateway 24 forwards the layer 2 frame to the computing device 26-1 (FIG. 4, block 3054).

Figure 5A:
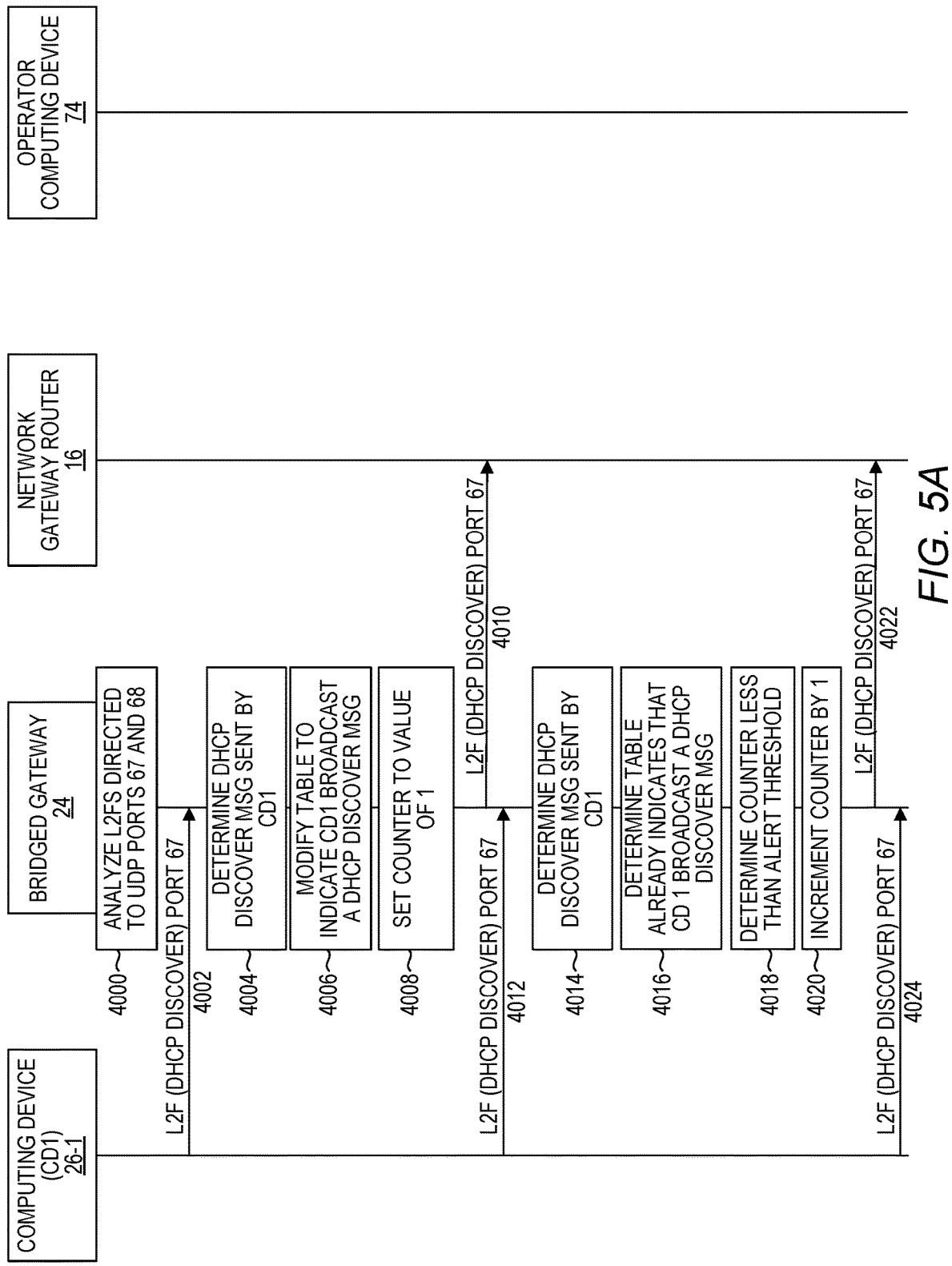

FIGS. 5A-5B depict a message sequence diagram illustrating messages between and actions taken by various components illustrated in FIGS. 1A-1C to implement efficient detection of DHCP service unavailability in a network gateway router according to another embodiment. In this embodiment, rather than maintaining a timer, the bridged gateway 24 maintains a counter that quantifies retry attempts.

The bridged gateway 24 analyzes layer 2 frames directed to ports 67 and 68 (FIG. 5, block 4000). The computing device 26-1 generates and broadcasts a layer 2 frame that includes a DHCP discover message and is directed to a UDP port 67 (FIG. 5, block 4002). The bridged gateway 24 receives the layer 2 frame and determines that the layer 2 frame includes the DHCP discover message (FIG. 5, block 4004). The bridged gateway 24 modifies the table 48 to indicate that the computing device 26-1 broadcast the DHCP discover message by setting the DHCP sequence ID 58 to a value of "D" (FIG. 5, block 4006). The bridged gateway 24 sets a counter that corresponds to the computing device 26-1 to a value of 1 (FIG. 5, block 4008). The bridged gateway 24 sends the layer 2 frame to the network gateway router 16 (FIG. 5, block 4010).

There is no response from the network gateway router 16. The computing device 26-1, after a predetermined time interval automatically retries to obain an IP address if no response is received to a DHCP discover message. The computing device 26-1 generates and broadcasts another layer 2 frame that includes a DHCP discover message and is directed to a UDP port 67 (FIG. 5, block 4012). The bridged gateway 24 receives the layer 2 frame and determines that the layer 2 frame includes the DHCP discover message (FIG. 5, block 4014). The bridged gateway 24 accesses the table 48 and determines, based on the DHCP sequence ID 58 having a value of "D" and the counter having a value of 1, that the computing device 26-1 previously sent a DHCP discover message that was not responded to (FIG. 5, block 4016). The bridged gateway 24 compares the value of the counter to an alert threshold, such as, by way of non-limiting example, two (FIG. 5, block 4018). In response to the value of the counter being less than the alert threshold, the bridged gateway 24 increments the counter by 1 and sends the layer 2 frame to the network gateway router 16 (FIG. 5, blocks 4020, 4022).

There is again no response from the network gateway router 16. The computing device 26-1, after the predetermined time interval, generates and broadcasts another layer 2 frame that includes a DHCP discover message and is directed to a UDP port 67 (FIG. 5, block 4024). Referring now to FIG. 5B, the bridged gateway 24 receives the layer 2 frame and determines that the layer 2 frame includes the DHCP discover message (FIG. 5, block 4026). The bridged gateway 24 accesses the table 48 and determines, based on the DHCP sequence ID 58 having a value of "D" and the counter having a value of 2, that the computing device 26-1 previously sent two DHCP discover messages that were not responded to (FIG. 5, block 4028). The bridged gateway 24 compares the value of the counter to an alert threshold, such as, by way of non-limiting example, two (FIG. 5, block 4030). The bridged gateway 24 determines that the counter is equal to the alert threshold of two, and sends an alert to the operator computing device 74 indicating that the DHCP service 20 is not operable (FIG. 5, blocks 4030, 4032).

Figure 6A:
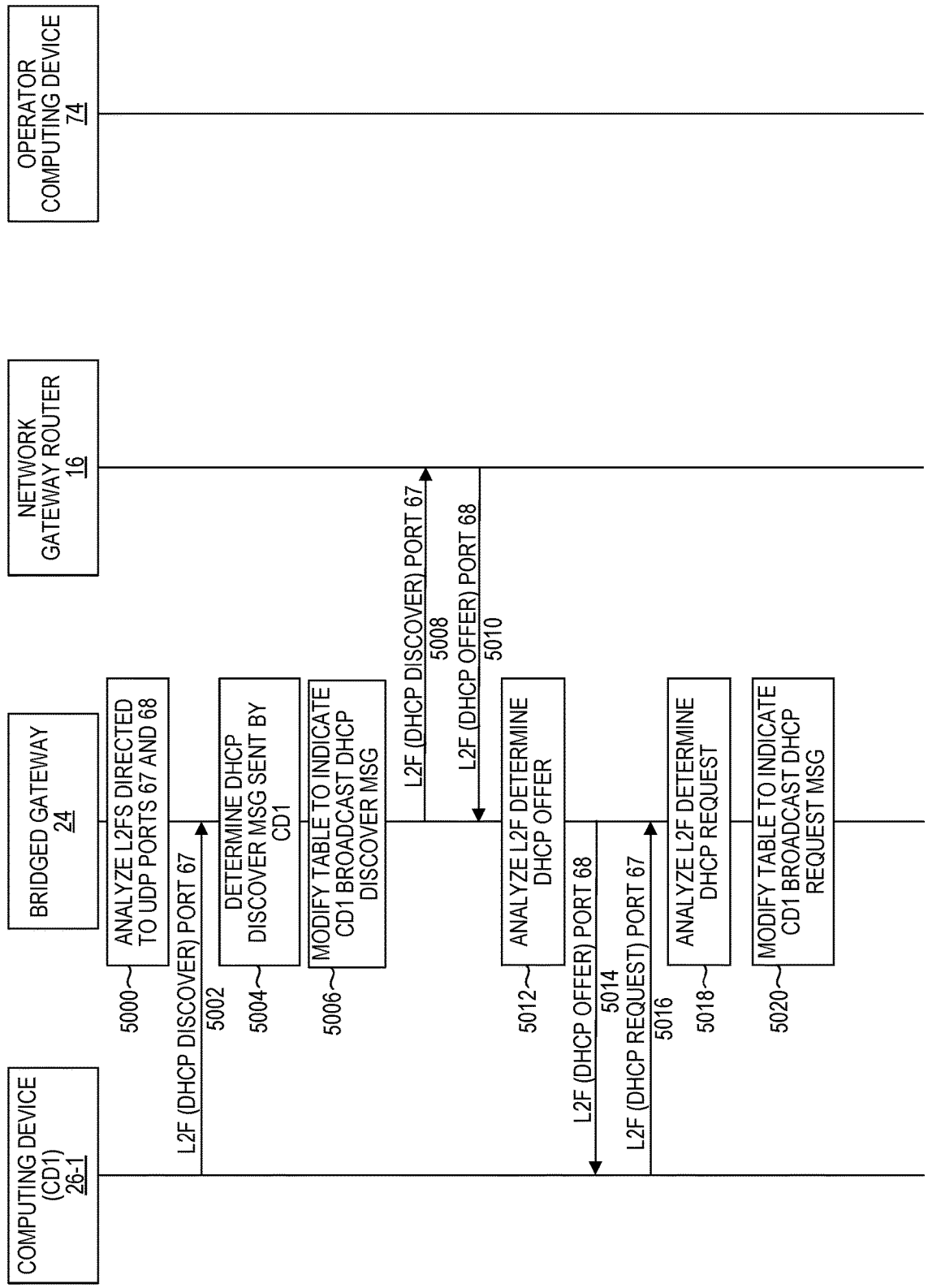
FIGS. 6A-6B depict a message sequence diagram illustrating messages between and actions taken by various components illustrated in FIGS. 1A-1C when the DHCP service is operable according to one embodiment.
Figure 6B:
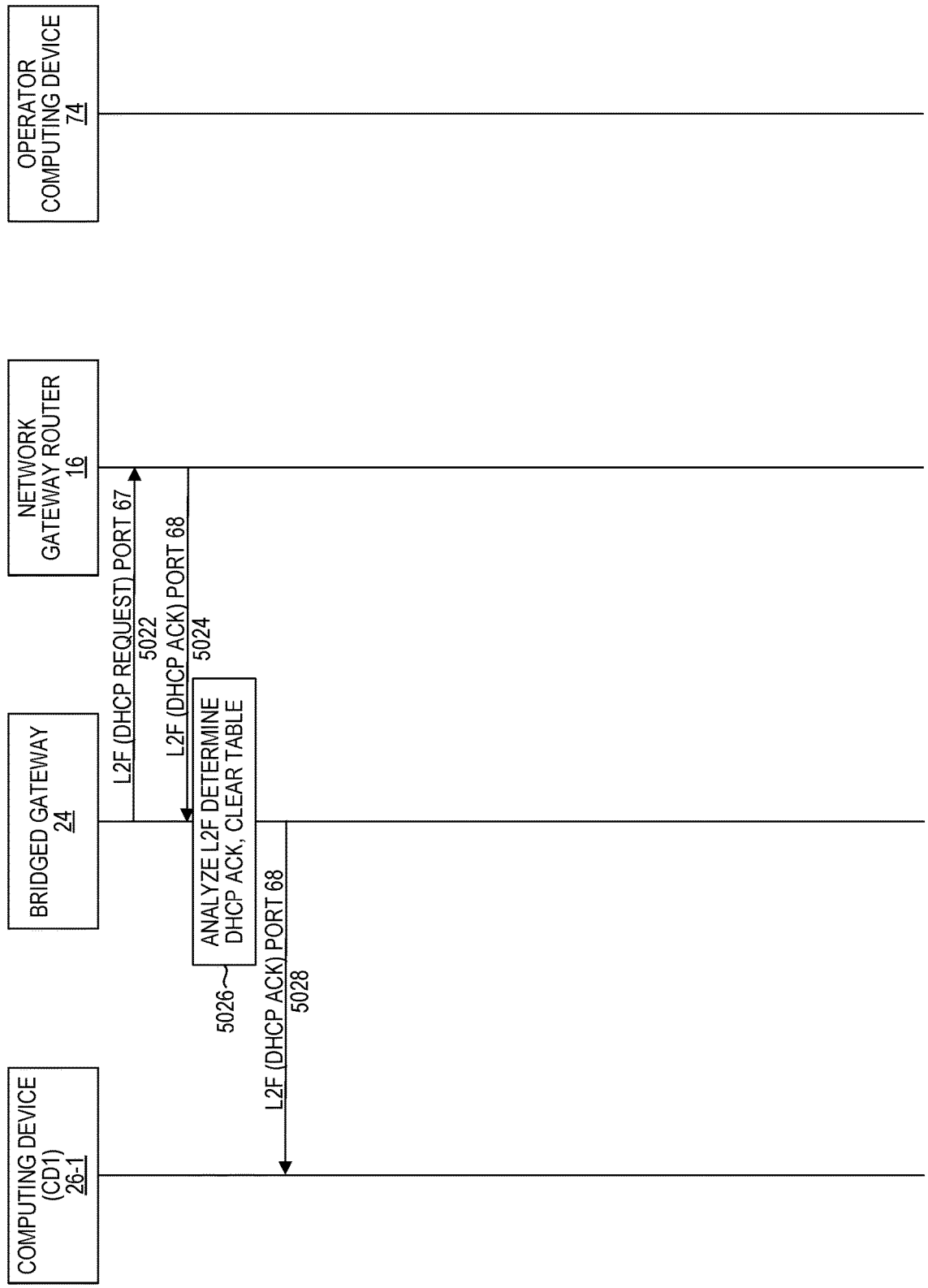

FIGS. 6A-6B depict a message sequence diagram illustrating messages between and actions taken by various components illustrated in FIGS. 1A-1C when the DHCP service 20 is operable according to one embodiment.

The bridged gateway 24 analyzes layer 2 frames directed to ports 67 and 68 (FIG. 6, block 5000). The computing device 26-1 generates and broadcasts a layer 2 frame that includes a DHCP discover message and is directed to a UDP port 67 (FIG. 6, block 5002). The bridged gateway 24 receives the layer 2 frame and determines that the layer 2 frame includes the DHCP discover message (FIG. 6, block 5004). The bridged gateway 24 modifies the table 48 to indicate that the computing device 26-1 broadcast the DHCP discover message (FIG. 6, block 5006). The modification could include one or more of the previous modifications discussed above, such as setting a timer, incrementing a counter, and/or setting the DHCP sequence ID 58 to a value of "D" (FIG. 6, block 5008). The bridged gateway 24 sends the layer 2 frame to the network gateway router 16 (FIG. 6, block 5010).

The network gateway router 16 responds with a layer 2 frame that includes a DHCP offer message (FIG. 6, block 5010). The bridged gateway 24 analyzes the layer 2 frame and determines that the layer 2 frame includes a DHCP offer message (FIG. 6, block 5012). If a timer had been set in block 5006, the bridged gateway 24 turns off the timer. The bridged gateway 24 sends the layer 2 frame to the computing device 26-1 (FIG. 6, block 5014). The bridged gateway 24 subsequently receives, from the computing device 26-1, a layer 2 frame comprising a DHCP request message (FIG. 6, block 5016). The bridged gateway 24 analyzes the layer 2 frame and determines that it includes a DHCP request message (FIG. 6, block 5018). The bridged gateway 24 modifies the table 48 to indicate that the computing device 26-1 broadcast the DHCP request message (FIG. 6, block 5020). The modification could include one or more of the previous modification discussed above, such as setting a timer, incrementing a counter, and/or setting the DHCP sequence ID 58 to a value of "R". Referring now to FIG. 6B, the bridged gateway 24 sends the layer 2 frame to the network gateway router 16 (FIG. 6, block 5022).

The network gateway router 16 responds with a layer 2 frame that includes a DHCP acknowledge message (FIG. 6, block 5024). The bridged gateway 24 analyzes the layer 2 frame and determines that the layer 2 frame includes the DHCP acknowledge message. The bridged gateway 24 determines that the DHCP sequence was successful and clears the entry in the table 48 that corresponds to the computing device 26-1 (FIG. 6, block 5026). The bridged gateway 24 sends the layer 2 frame to the computing device 26-1 (FIG. 6, block 5028).

Figure 7:
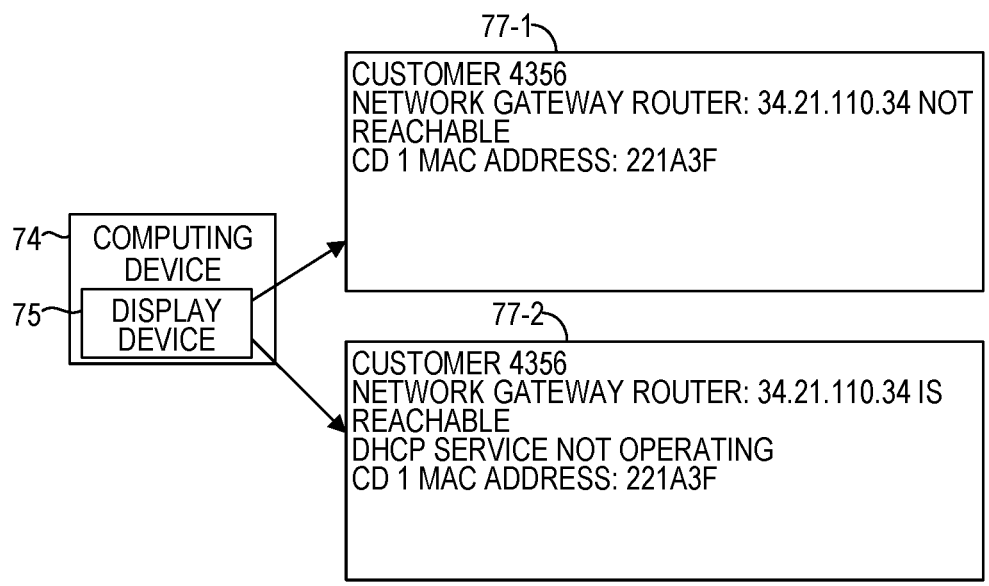
FIG. 7 is a block diagram illustrating content of alerts that may be sent to an operator computing device according to some embodiments.

FIG. 7 is a block diagram illustrating the content of alerts that may be sent to the operator computing device 74 according to some embodiments. In one example, the operator computing device 74 may receive an alert 77-1 and present the alert 77-1 on a display device 75. The alert 77-1 identifies a particular customer of the service provider, an IP address of the network gateway router 16, and an indication that the network gateway router 16 is unreachable, and a MAC address of the computing device 26-1.

In another example, the operator computing device 74 may receive an alert 77-2 and present the alert 77-2 on a display device 75. The alert 77-2 identifies a particular customer of the service provider, an IP address of the network gateway router 16, a MAC address of the computing device 26-1, and an indication that the network gateway router 16 is reachable, but that the DHCP service is not operating.

Figure 8:
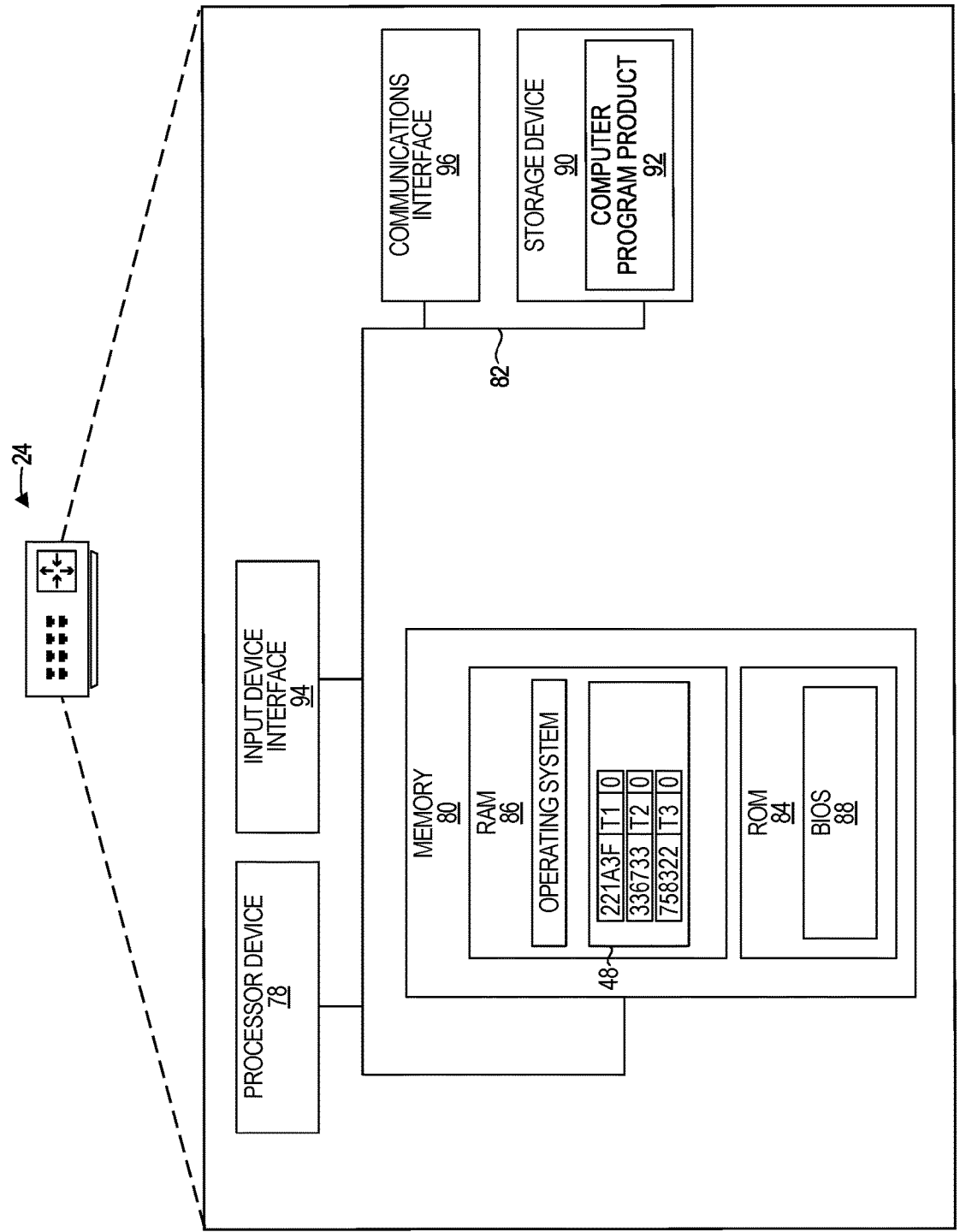
FIG. 8 is a block diagram of a bridged gateway suitable for implementing embodiment disclosed herein according to one example.

FIG. 8 is a block diagram of the bridged gateway 24 suitable for implementing examples according to one example. The bridged gateway 24 includes a processor device 78, a system memory 80, and a system bus 82. The system bus 82 provides an interface for system components including, but not limited to, the system memory 80 and the processor device 78. The processor device 78 can be any commercially available or proprietary processor device.

The system bus 82 may be any of several types of bus structures that may further interconnect to a memory bus (with or without a memory controller), a peripheral bus, and/or a local bus using any of a variety of commercially available bus architectures. The system memory 80 may include non-volatile memory 84 (e.g., read-only memory (ROM), erasable programmable read-only memory (EPROM), electrically erasable programmable read-only memory (EEPROM), etc.), and volatile memory 86 (e.g., random-access memory (RAM)). A basic input/output system (BIOS) 88 may be stored in the non-volatile memory 84 and can include the basic routines that help to transfer information between elements within the bridged gateway 24. The volatile memory 86 may also include a high-speed RAM, such as static RAM, for caching data.

The bridged gateway 24 may further include or be coupled to a non-transitory computer-readable storage medium such as a storage device 90, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 90 and other drives associated with computer-readable media and computer-usable media may provide non-volatile storage of data, data structures, computer-executable instructions, and the like.

A number of modules can be stored in the storage device 90 and in the volatile memory 86, including an operating system and one or more program modules, which may implement the functionality described herein in whole or in part. All or a portion of the examples may be implemented as a computer program product 92 stored on a transitory or non-transitory computer-usable or computer-readable storage medium, such as the storage device 90, which includes complex programming instructions, such as complex computer-readable program code, to cause the processor device 78 to carry out the steps described herein. Thus, the computer-readable program code can comprise software instructions for implementing the functionality of the examples described herein when executed on the processor device 78.

An operator may also be able to enter one or more configuration commands through a keyboard (not illustrated), a pointing device such as a mouse (not illustrated), or a touch-sensitive surface such as a display device. Such input devices may be connected to the processor device 78 through an input device interface 94 that is coupled to the system bus 82 but can be connected by other interfaces such as a parallel port, an Institute of Electrical and Electronic Engineers (IEEE) 1394 serial port, a Universal Serial Bus (USB) port, an IR interface, and the like. The bridged gateway 24 may also include a communications interface 96 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a bridged gateway coupled to a local area network (LAN), a first layer 2 frame from a device coupled to the LAN;
in response to determining that the first layer 2 frame is a layer 2 frame, storing, by the bridged gateway, information that identifies the device;
forwarding, by the bridged gateway to a network gateway router that provides layer 3 routing services for the LAN and includes a dynamic host configuration protocol (DHCP) service, the first layer 2 frame via a layer 2 tunnel;
determining, by the bridged gateway, that the first layer 2 frame comprises a first DHCP discover message, the first DHCP discover message comprising an initial message in a four message sequence used by the network gateway router and the device to provide an internet protocol (IP) address to the device;
determining, by the bridged gateway, based at least in part on the information that identifies the device and an expiration of a timer, that the four message sequence between the device and the network gateway router did not complete; and
in response to determining that the four message sequence did not complete, sending, by the bridged gateway to a destination, an alert that comprises information indicating a problem with obtaining an IP address via the DHCP service.

2. The method of claim 1 further comprising:
determining, by the bridged gateway, that the network gateway router responded to the first DHCP discover message with a DHCP offer message, the DHCP offer message comprising a second message in the four message sequence;
subsequently determining, by the bridged gateway, that the network gateway router one of failed to respond with a DHCP acknowledge message or responded with a DHCP NAK message; and
in response to subsequently determining that the network gateway router one of failed to respond with a DHCP acknowledge message or responded with a DHCP NAK message, including in the alert, by the bridged gateway, information that indicates that the network gateway router is reachable but a DHCP service of the network gateway router is inoperable.

3. The method of claim 1 further comprising:
determining, by the bridged gateway, that the network gateway router failed to respond to the first DHCP discover message with a DHCP offer message, the DHCP offer message comprising a second message in the four message sequence; and
in response to determining that the network gateway router failed to respond to the first DHCP discover message with the DHCP offer message, including in the alert, by the bridged gateway, information that indicates that the network gateway router is not reachable.

4. The method of claim 1 wherein the bridged gateway is operable to forward a layer 2 broadcast frame to the network gateway router, and to not forward a layer 2 frame addressed to a device directly connected to the LAN.

5. The method of claim 1 further comprising:
determining, by the bridged gateway, that the first layer 2 frame is addressed to a port 67 or a port 68; and in response to determining that the first layer 2 frame is addressed to the port 67 or the port 68, determining, by the bridged gateway, that the layer 2 frame comprises the first DHCP discover message.

6. The method of claim 1 wherein determining, by the bridged gateway, that the four message sequence between the device and the network gateway router did not complete further comprises:
storing, in a data structure, a device identifier of the device and information indicating the device sent the first DHCP discover message;
determining that the network gateway router did not respond with a DHCP offer message within a predetermined time interval; and
in response to determining that the network gateway router did not respond within the predetermined time interval, including in the alert, by the bridged gateway, information that indicates that the network gateway router is not reachable.

7. The method of claim 1 wherein determining, by the bridged gateway, that the message sequence between the device and the network gateway router did not complete further comprises:
receiving, by the bridged gateway, a second layer 2 frame from the device;
forwarding, by the bridged gateway to the network gateway router, the second layer 2 frame via the layer 2 tunnel;
determining, by the bridged gateway, that the second layer 2 frame comprises a second DHCP discover message; and
accessing, by the bridged gateway, a data structure that indicates the device previously sent the first DHCP discover message and no response to the first DHCP discover message was received.

8. The method of claim 1 further comprising:
prior to sending the alert, incrementing, by the bridged gateway, a counter;
repeatedly, by the bridged gateway until the counter has a value that meets an alert threshold:
receiving, by the bridged gateway, a layer 2 frame from the device;
determining, by the bridged gateway, that the layer 2 frame comprises a DHCP discover message;
forwarding, by the bridged gateway to the network gateway router via the layer 2 tunnel, the layer 2 frame; and
incrementing the counter; and
in response to the counter having the value that meets the alert threshold, sending, by the bridged gateway to the destination, the alert.

9. A bridged gateway, comprising:
a memory; and
a processor device coupled to the memory configured to:
receive a first layer 2 frame from a device coupled to a local area network (LAN);
in response to determining that the first layer 2 frame is a layer 2 frame, store information that identifies the device;
forward, to a network gateway router that provides layer 3 routing services for the LAN and includes a dynamic host configuration protocol (DHCP) service, the first layer 2 frame via a layer 2 tunnel;
determine that the first layer 2 frame comprises a first DHCP discover message, the first DHCP discover message comprising an initial message in a four message sequence used by the network gateway router and the device to provide an internet protocol (IP) address to the device;
determine, based at least in part on the information that identifies the device and an expiration of a timer, that the four message sequence between the device and the network gateway router did not complete; and
in response to determining that the four message sequence did not complete, send, to a destination, an alert that comprises information indicating a problem with obtaining an IP address via the DHCP service.

10. The bridged gateway of claim 9, wherein the processor device is further configured to:
determine that the network gateway router responded to the first DHCP discover message with a DHCP offer message, the DHCP offer message comprising a second message in the four message sequence;
subsequently determine that the network gateway router one of failed to respond with a DHCP acknowledge message or responded with a DHCP NAK message; and
in response to subsequently determining that the network gateway router one of failed to respond with a DHCP acknowledge message or responded with a DHCP NAK message, include in the alert information that indicates that the network gateway router is reachable but a DHCP service of the network gateway router is inoperable.

11. The bridged gateway of claim 9, wherein the processor device is further configured to:
determine that the network gateway router failed to respond to the first DHCP discover message with a DHCP offer message, the DHCP offer message comprising a second message in the four message sequence; and
in response to determining that the network gateway router failed to respond to the first DHCP discover message with the DHCP offer message, include in the alert information that indicates that the network gateway router is not reachable.

12. The bridged gateway of claim 9, wherein the processor device is further configured to:
determine that the first layer 2 frame is addressed to a port 67 or a port 68; and
in response to determining that the first layer 2 frame is addressed to the port 67 or the port 68, determine that the layer 2 frame comprises the first DHCP discover message.

13. The bridged gateway of claim 9, wherein to determine that the four message sequence between the device and the network gateway router did not complete, the processor device is further configured to:
store, in a data structure, a device identifier of the device and information indicating the device sent the first DHCP discover message;
determine that the network gateway router did not respond with a DHCP offer message within a predetermined time interval; and
in response to determining that the network gateway router did not respond within the predetermined time interval, include in the alert information that indicates that the network gateway router is not reachable.

14. The bridged gateway of claim 9, wherein to determine that the message sequence between the device and the network gateway router did not complete, the processor device is further configured to:
receive a second layer 2 frame from the device;

forward, to the network gateway router, the second layer 2 frame via the layer 2 tunnel;

determine that the second layer 2 frame comprises a second DHCP discover message; and access a data structure that indicates the device previously sent the first DHCP discover message and no response to the first DHCP discover message was received.

15. A non-transitory computer-readable storage medium that includes executable instructions configured to cause a processor device of a bridged gateway to:

receive a first layer 2 frame from a device coupled to a local area network (LAN);

in response to determining that the first layer 2 frame is a layer 2 frame, store information that identifies the device;

forward, to a network gateway router that provides layer 3 routing services for the LAN and includes a dynamic host configuration protocol (DHCP) service, the first layer 2 frame via a layer 2 tunnel;

determine that the first layer 2 frame comprises a first DHCP discover message, the first DHCP discover message comprising an initial message in a four message sequence used by the network gateway router and the device to provide an internet protocol (IP) address to the device;

determine, based at least in part on the information that identifies the device and an expiration of a timer, that the four message sequence between the device and the network gateway router did not complete; and in response to determining that the four message sequence did not complete, send, to a destination, an alert that comprises information indicating a problem with obtaining an IP address via the DHCP service.

16. The non-transitory computer-readable storage medium of claim 15, wherein the instructions further cause the processor device to:

determine that the network gateway router responded to the first DHCP discover message with a DHCP offer message, the DHCP offer message comprising a second message in the four message sequence;

subsequently determine that the network gateway router one of failed to respond with a DHCP acknowledge message or responded with a DHCP NAK message; and in response to subsequently determining that the network gateway router one of failed to respond with a DHCP acknowledge message or responded with a DHCP NAK message, include in the alert information that indicates that the network gateway router is reachable but a DHCP service of the network gateway router is inoperable.

17. The non-transitory computer-readable storage medium of claim 15, wherein the instructions further cause the processor device to:

determine that the network gateway router failed to respond to the first DHCP discover message with a DHCP offer message, the DHCP offer message comprising a second message in the four message sequence; and in response to determining that the network gateway router failed to respond to the first DHCP discover message with the DHCP offer message, include in the alert information that indicates that the network gateway router is not reachable.

18. The non-transitory computer-readable storage medium of claim 15, wherein to determine that the four message sequence between the device and the network gateway router did not complete, the instructions further cause the processor device to:

store, in a data structure, a device identifier of the device and information indicating the device sent the first DHCP discover message;

determine that the network gateway router did not respond with a DHCP offer message within a predetermined time interval; and in response to determining that the network gateway router did not respond within the predetermined time interval, include in the alert information that indicates that the network gateway router is not reachable.

19. The non-transitory computer-readable storage medium of claim 15, wherein to determine that the message sequence between the device and the network gateway router did not complete, the instructions further cause the processor device to:

receive a second layer 2 frame from the device;

forward, to the network gateway router, the second layer 2 frame via the layer 2 tunnel;

determine that the second layer 2 frame comprises a second DHCP discover message; and access a data structure that indicates the device previously sent the first DHCP discover message and no response to the first DHCP discover message was received.

* * * * *